United States Patent
Zhang et al.

(10) Patent No.: US 8,354,999 B2
(45) Date of Patent: Jan. 15, 2013

(54) BUTTON ASSEMBLY AND COMPUTER MOUSE HAVING THE SAME

(75) Inventors: Qiang Zhang, Shenzhen (CN); Ji-Ying Jin, Shenzhen (CN); Chuang Yue, Shenzhen (CN); Lie Zhang, Shenzhen (CN); En-Long Hao, Shenzhen (CN); Hong-Yi Tao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 797 days.

(21) Appl. No.: 12/494,315

(22) Filed: Jun. 30, 2009

(65) Prior Publication Data

US 2010/0090952 A1  Apr. 15, 2010

(30) Foreign Application Priority Data

Oct. 10, 2008  (CN) .......................... 2008 1 0304866

(51) Int. Cl.
*G09G 5/00* (2006.01)
*G09G 5/08* (2006.01)
*G06F 3/033* (2006.01)
*H01H 83/00* (2006.01)
*H01H 35/02* (2006.01)
*H01H 35/14* (2006.01)
*H01R 39/00* (2006.01)

(52) U.S. Cl. .......... 345/163; 345/156; 345/157; 200/12; 200/19.36; 200/61.45 M

(58) Field of Classification Search .................. 345/156, 345/157, 163–166; 200/12, 19.36, 61.45 M
See application file for complete search history.

(56) References Cited

U.S. PATENT DOCUMENTS

| 6,310,526 | B1 * | 10/2001 | Yip et al. ........................ 333/262 |
| 6,587,093 | B1 * | 7/2003 | Shaw et al. ..................... 345/163 |
| 6,593,834 | B2 * | 7/2003 | Qiu et al. ....................... 333/262 |
| 6,761,494 | B2 * | 7/2004 | Hsu et al. ....................... 400/495 |
| 7,385,645 | B2 * | 6/2008 | Boon ............................ 348/373 |
| 2006/0267933 | A1 * | 11/2006 | Tai et al. ........................ 345/157 |
| 2009/0220928 | A1 * | 9/2009 | Chen et al. ..................... 434/317 |

* cited by examiner

*Primary Examiner* — Bipin Shalwala
*Assistant Examiner* — Ilana Spar
(74) *Attorney, Agent, or Firm* — Altis Law Group, Inc.

(57) ABSTRACT

A computer mouse includes a housing and a button assembly. The button assembly includes a button, a circuit board, a first conductive sheet, and a second conductive sheet. The button is exposed out of the housing. The circuit board is received in the housing, and includes a first contact and a second contact. The first conductive sheet has a first magnet fixed thereon, and is electrically connected to the first contact of the circuit board. The second conductive sheet is electrically connected to the second contact of the circuit board. The second conductive sheet is fixed to the button and contactable with the first conductive sheet when the button is pressed. The second magnet and the first magnet form a repulsive force therebetween.

2 Claims, 3 Drawing Sheets

BUTTON ASSEMBLY AND COMPUTER MOUSE HAVING THE SAME

BACKGROUND

1. Technical Field

The present disclosure relates to button assemblies and, particularly, to a noiseless or low-noise button assembly and a computer mouse having the button assembly.

2. Description of Related Art

A typical computer mouse includes two buttons and a circuit board. Each button includes a metal plate fixed thereon, and two contacts corresponding to each button are formed on the circuit board. When the button is pressed, the metal plate of the button will electrically connect the two contacts, and therefore, an electrical signal is transmitted between the two contacts to execute a command of the computer mouse. However, because of the impact between the metal plate and the contacts, a very unpleasant mechanical noise is emitted while pressing the button.

What is needed, therefore, is a computer mouse to overcome or at least mitigate the above-described problem.

BRIEF DESCRIPTION OF THE DRAWINGS

Many aspects of the present button assembly and computer mouse can be better understood with reference to the accompanying drawings. The components in the drawings are not necessarily drawn to scale, the emphasis instead being placed upon clearly illustrating the principles of the present button assembly and computer mouse. In the drawings, all the views are schematic.

DETAILED DESCRIPTION

Embodiments of the present disclosure will now be described in detail below, with reference to the accompanying drawings.

Figure 1:
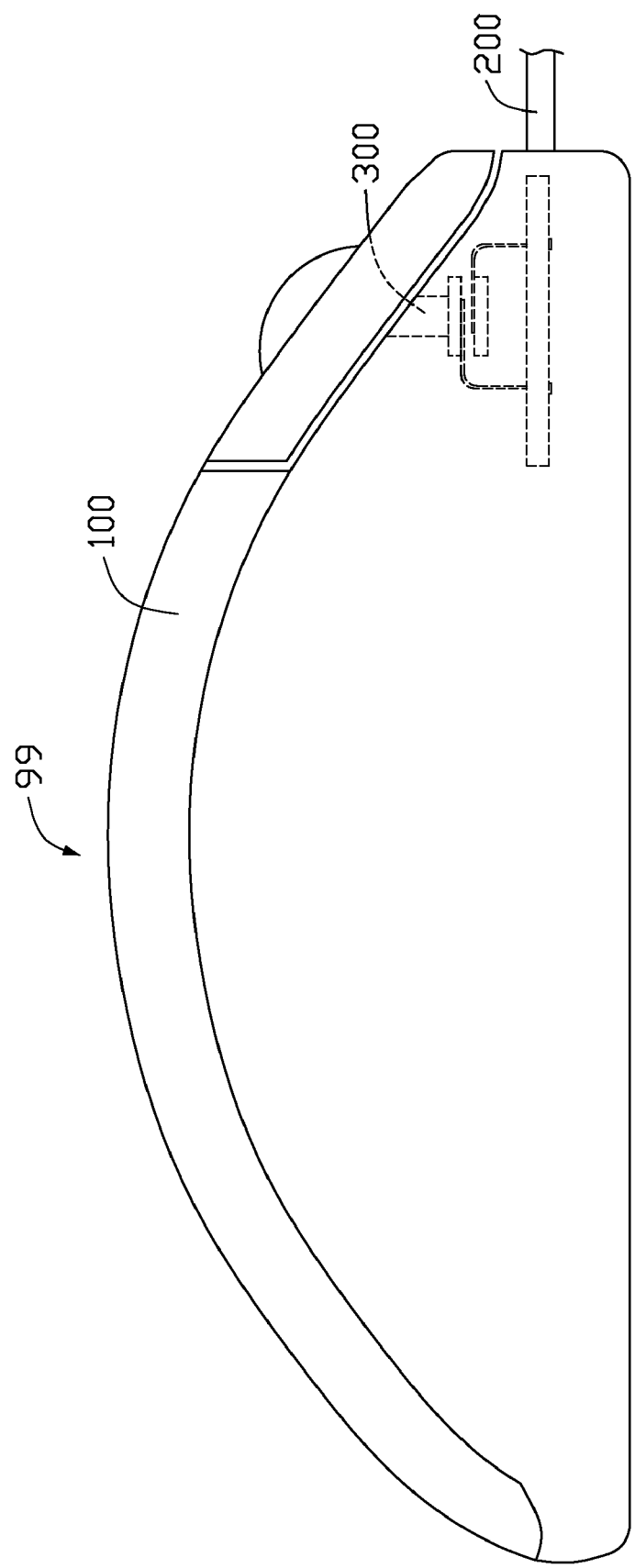
FIG. 1 is a schematic view of a computer mouse according to a first exemplary embodiment.

Referring to the FIG. 1, a computer mouse 99, according to a first exemplary embodiment, is shown. The computer mouse 99 includes a housing 100, a signal line 200, and at least one button assembly 300 disposed near the signal line 200.

Figure 2:
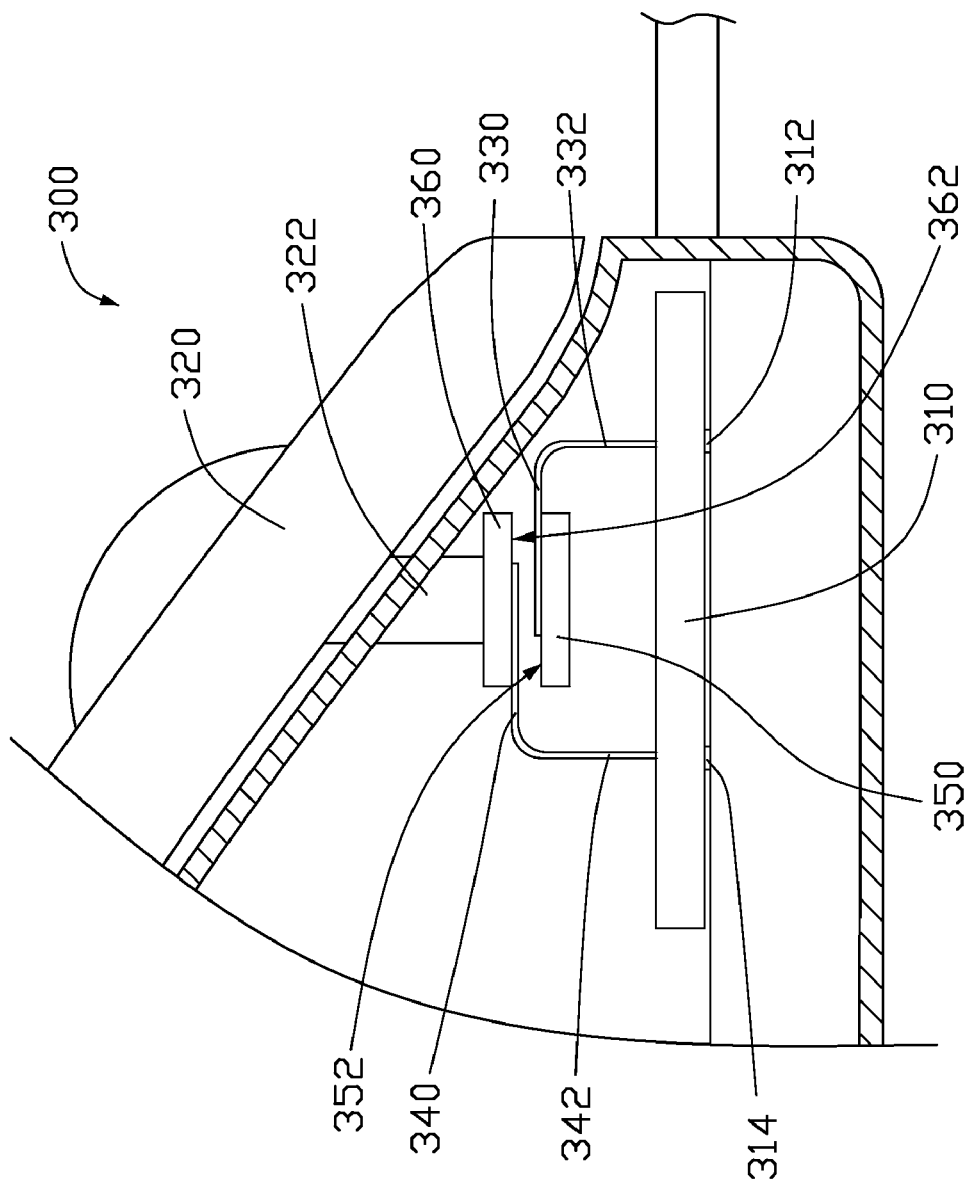
FIG. 2 is a schematic view of a button assembly of the computer mouse of FIG. 1.

Referring to the FIG. 2, each button assembly 300 includes a circuit board 310, a button 320, a first conductive sheet 330, a second conductive sheet 340, a first magnet 350, and a second magnet 360.

The circuit board 310 is received in the housing 100, and includes a first contact 312 and a second contact 314. The button 320 is exposed out of the housing 100, and includes a protrusion 322 extending towards the circuit board 310.

The first conductive sheet 330 and the second conductive sheet 340 are disposed between the circuit board 310 and the button 320, wherein, the first conductive sheet 330 is relatively adjacent to the circuit board 310, and the second conductive sheet 340 is relatively adjacent to the button 320. The first conductive sheet 330 and the second conductive sheet 340 are substantially parallel to each other.

The first conductive sheet 330 is electrically connected to the first contact 312 of the circuit board 310 via a first connecting portion 332. The first conductive sheet 330 is substantially parallel to the circuit board 310. An upper surface 352 of the first magnet 350 facing the button 320 is fixed to a lower surface of the first conductive sheet 330 facing the circuit board 310. In the present embodiment, the first magnet 350 is separated from the circuit board 310. The first connecting portion 332 is an elastic sheet for supporting the first conductive sheet 330 and the first magnet 350, and is integrally formed with the first conductive sheet 330. In other embodiments, the first magnet 350 can also be mounted on the circuit board 310, thus, the first conductive sheet 330 can be supported by the first magnet 350.

The second conductive sheet 340 is fixed to the protrusion 322 of the button 320, and is electrically connected to the second contact 314 of the circuit board 310 via a second connecting portion 342. A lower surface 362 of the second magnet 360 facing the circuit board 310 is fixed to an upper surface of the second conductive sheet 340 facing the button 320. At least a portion of the first conductive sheet 330 is under the second conductive sheet 340 so that the second conductive sheet 340 is contactable with the first conductive sheet 330 when the button 320 is pressed. In the present embodiment, the second connecting portion 342 is an elastic sheet capable of supporting the second conductive sheet 340, the second magnet 360, and the button 320. The second connecting portion 342 is integrally formed with the second conductive sheet 340.

The upper surface 352 of the first magnet 350 and the lower surface 362 of the second magnet 360 have a same polarity, and repulse each other. Therefore, the impact between the first conductive sheet 330 and the second conductive sheet 340 can be minimized, and the mechanical noise caused by the impact can be decreased. Furthermore, because the first connecting portion 332 is an elastic sheet and deformable when the first conductive sheet 330 is pressed, the impact between the first conductive sheet 330 and the second conductive sheet 340 can be further mitigated.

Figure 3:
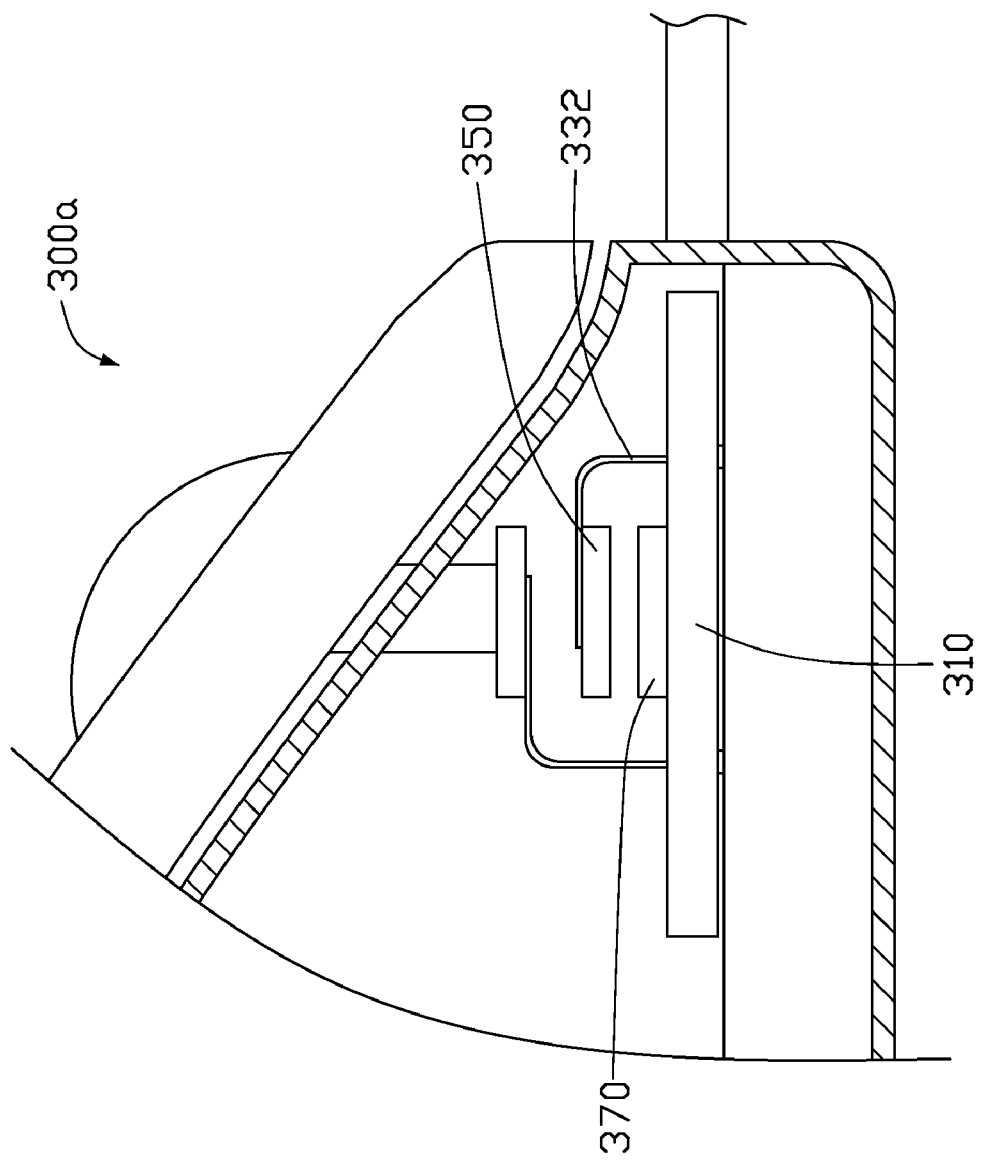
FIG. 3 is a schematic view of a button assembly according to a second exemplary embodiment.

Referring to the FIG. 3, a button assembly 300a, according to a second exemplary embodiment, is shown. The button assembly 300a is similar to the button assembly 300 of the first embodiment. The difference between the button assembly 300a of the second embodiment and the button assembly 300 is that, the button assembly 300a further includes a third magnet 370 mounted on the circuit board 310. The third magnet 370 can apply a repulsive force to the first magnet 350 to prevent the first magnet 350 damaging the circuit board 310 when the first connecting portion 332 deforms.

While certain embodiments have been described and exemplified above, various other embodiments will be apparent to those skilled in the art from the foregoing disclosure. The invention is not limited to the particular embodiments described and exemplified, and the embodiments are capable of considerable variation and modification without departure from the scope and spirit of the appended claims.

What is claimed is:

1. A computer mouse comprising:
a housing; and
a button assembly, the button assembly comprising:
   a button exposed out of the housing;
   a circuit board received in the housing, the circuit board comprising a first contact and a second contact;
   a first conductive sheet with a first magnet fixed thereon and separated from the circuit board, and electrically connected to the first contact of the circuit board via a first connecting portion, wherein the first connecting portion is an elastic sheet for supporting the first conductive sheet and the first magnet;

a second conductive sheet with a second magnet fixed thereon and electrically connected to the second contact of the circuit board, the second conductive sheet being fixed to the button and contactable with the first conductive sheet when the button is pressed, the second magnet and the first magnet forming a repulsive force therebetween, wherein the circuit board detects a connection between the first conductive sheet and the second conductive sheet when the button is pressed; and a third magnet mounted on the circuit board for applying a repulsive force to the first magnet.

2. A button assembly comprising:

a button;

a circuit board comprising a first contact and a second contact;

a first conductive sheet with a first magnet fixed thereon and separated from the circuit board, and electrically connected to the first contact of the circuit board via a first connecting portion, wherein the first connecting portion is an elastic sheet for supporting the first conductive sheet and the first magnet;

a second conductive sheet with a second magnet fixed thereon and electrically connected to the second contact of the circuit board, the second conductive sheet being fixed to the button and contactable with the first conductive sheet when the button is pressed, the second magnet and the first magnet forming a repulsive force therebetween, wherein the circuit board detects a connection between the first conductive sheet and the second conductive sheet when the button is pressed; and a third magnet mounted on the circuit board for applying a repulsive force to the first magnet.

* * * * *